US007992039B2

(12) United States Patent
Belyakov et al.

(10) Patent No.: US 7,992,039 B2
(45) Date of Patent: Aug. 2, 2011

(54) FAILOVER AND LOAD BALANCING

(75) Inventors: Alexander Belyakov, Nizhny Novgorod (RU); Mikhail Sennikovsky, Nizhny Novgorod (RU); Alexey Drozdov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/749,407

(22) Filed: Mar. 29, 2010

(65) Prior Publication Data
US 2010/0185794 A1    Jul. 22, 2010

Related U.S. Application Data

(62) Division of application No. 10/599,055, filed as application No. PCT/RU2004/000105 on Mar. 19, 2004, now Pat. No. 7,721,150.

(51) Int. Cl.
*G06F 11/00*    (2006.01)
(52) U.S. Cl. .......................................................... 714/16
(58) Field of Classification Search .................. 714/2–4, 714/15, 16, 18, 19, 25, 26, 37–39, 43, 44, 714/48, 56
See application file for complete search history.

(56) References Cited

U.S. PATENT DOCUMENTS

| 4,403,286 | A | 9/1983 | Fry et al. |
| 5,006,781 | A | 4/1991 | Schultz et al. |
| 5,086,499 | A | 2/1992 | Mutone |
| 5,168,208 | A | 12/1992 | Schultz et al. |
| 5,390,068 | A | 2/1995 | Schultz et al. |
| 5,493,689 | A | 2/1996 | Waclawsky et al. |
| 5,495,426 | A | 2/1996 | Waclawsky et al. |
| 5,724,569 | A | 3/1998 | Andres |
| 5,790,775 | A | 8/1998 | Marks et al. |
| 6,052,795 | A | 4/2000 | Murotani et al. |
| 6,081,511 | A | 6/2000 | Carr et al. |
| 6,185,601 | B1 | 2/2001 | Wolff et al. |

(Continued)

FOREIGN PATENT DOCUMENTS

JP    2002304331    10/2002

(Continued)

OTHER PUBLICATIONS

Alacritech Inc., "Delivering High-Performance Storage Networking", 2001, 8 pp.

(Continued)

*Primary Examiner* — Nadeem Iqbal
(74) *Attorney, Agent, or Firm* — Konrad Raynes & Victor LLP; Janaki K. Davda

(57) ABSTRACT

Provided are techniques for static load balancing implemented in a filter driver. The filter driver determines a data quota for each of multiple data paths. The filter driver identifies a maximum number of commands for a target logical unit. The filter driver selects a data path on which to send a packet based on the data quota and the maximum number of commands. Also, provided are techniques for dynamic load balancing implemented in a filter driver. The filter driver determines a data transfer speed for each of multiple data paths. The filter driver updates a load balancing share for each of the multiple data paths based on the data transfer speed of each of the multiple data paths. The filter driver selects a data path on which to send a packet based on the load balancing share of each of the multiple data paths.

18 Claims, 12 Drawing Sheets

U.S. PATENT DOCUMENTS

| | | | |
|---|---|---|---|
| 6,381,218 | B1 | 4/2002 | McIntyre et al. |
| 6,430,610 | B1 | 8/2002 | Carter |
| 6,438,133 | B1 | 8/2002 | Ervin et al. |
| 6,453,360 | B1 | 9/2002 | Muller et al. |
| 6,470,397 | B1 | 10/2002 | Shah et al. |
| 6,526,521 | B1 | 2/2003 | Lim |
| 6,618,798 | B1 | 9/2003 | Burton et al. |
| 6,654,801 | B2 | 11/2003 | Mann et al. |
| 6,658,018 | B1 | 12/2003 | Tran et al. |
| 6,687,735 | B1 | 2/2004 | Logston et al. |
| 6,711,137 | B1 | 3/2004 | Klassen et al. |
| 6,769,071 | B1 * | 7/2004 | Cheng et al. ............... 714/4 |
| 6,802,021 | B1 * | 10/2004 | Cheng et al. ............... 714/4 |
| 6,823,477 | B1 | 11/2004 | Cheng et al. |
| 6,940,853 | B2 | 9/2005 | Yamada et al. |
| 6,941,341 | B2 | 9/2005 | Logston et al. |
| 6,990,553 | B1 | 1/2006 | Nakayama et al. |
| 7,003,687 | B2 | 2/2006 | Matsunami et al. |
| 7,016,367 | B1 | 3/2006 | Dyckerhoff et al. |
| 7,111,084 | B2 | 9/2006 | Tan et al. |
| 7,126,910 | B1 | 10/2006 | Sridhar |
| 7,134,040 | B2 | 11/2006 | Ayres |
| 7,139,242 | B2 | 11/2006 | Bays |
| 7,281,169 | B2 | 10/2007 | Golasky et al. |
| 7,307,948 | B2 | 12/2007 | Infante et al. |
| 7,308,604 | B2 | 12/2007 | McDonnell et al. |
| 7,310,341 | B2 | 12/2007 | Prager et al. |
| 7,313,681 | B2 | 12/2007 | Chen et al. |
| 7,330,972 | B2 | 12/2008 | Vlodavsky et al. |
| 7,496,104 | B2 | 2/2009 | Moussa et al. |
| 7,603,463 | B2 | 10/2009 | Argo |
| 7,721,150 | B2 | 5/2010 | Belyakov et al. |
| 7,760,626 | B2 * | 7/2010 | Malpani et al. ............... 370/230 |
| 7,783,779 | B1 * | 8/2010 | Scales et al. ............... 709/240 |
| 2002/0141343 | A1 | 10/2002 | Bays |
| 2003/0074473 | A1 | 4/2003 | Pham et al. |
| 2003/0126315 | A1 | 7/2003 | Tan et al. |
| 2003/0140191 | A1 | 7/2003 | McGowen et al. |
| 2004/0078632 | A1 * | 4/2004 | Infante et al. ............... 714/5 |
| 2004/0107304 | A1 | 6/2004 | Grun |
| 2004/0153710 | A1 | 8/2004 | Fair |
| 2004/0162901 | A1 | 8/2004 | Mangipudi et al. |
| 2004/0184483 | A1 | 9/2004 | Okamura et al. |
| 2004/0203827 | A1 | 10/2004 | Heiner et al. |
| 2004/0236860 | A1 | 11/2004 | Logston et al. |
| 2005/0185789 | A1 | 8/2005 | Goodwin |
| 2005/0259632 | A1 * | 11/2005 | Malpani et al. ............... 370/351 |
| 2006/0193331 | A1 | 8/2006 | Areddu et al. |
| 2006/0242313 | A1 | 10/2006 | Le et al. |
| 2006/0291392 | A1 | 12/2006 | Alicherry et al. |
| 2007/0030804 | A1 | 2/2007 | Kimball et al. |
| 2007/0070893 | A1 | 3/2007 | Butenweg et al. |
| 2007/0133406 | A1 | 6/2007 | Vasseur |
| 2007/0153763 | A1 | 7/2007 | Rampolla et al. |
| 2007/0271570 | A1 | 11/2007 | Brown et al. |
| 2008/0034249 | A1 | 2/2008 | Husain et al. |
| 2008/0291826 | A1 | 11/2008 | Licardie et al. |
| 2009/0193105 | A1 | 7/2009 | Charny et al. |

FOREIGN PATENT DOCUMENTS

| | | |
|---|---|---|
| RU | 2202123 | 4/2003 |

OTHER PUBLICATIONS

ANSI, "Fibre Channel—Arbitrated Loop (FC-AL)", Draft Proposal, Revision 4.5, Jun. 1, 1995, 102 pp.

ANSI, "Fibre Channel—Fabric Generic Requirements (FC-FG)", Draft Proposal, Revision 3.5, Aug. 7, 1996, 35 pp.

ANSI, "Fibre Channel—Framing and Signaling (FC-FS)", Draft Proposal, Apr. 9, 2003, 106 pp.

ANSI, "Fibre Channel—Generic Services (FC-GS)", Draft Proposal, Revision 3.1, Aug. 7, 1996, 100 pp.

ANSI, "Information Systems—dpANS Fibre Channel Protocol for SCSI", Draft Proposal, Revision 12, Dec. 4, 1995, 75 pp.

Aspen Systems, "Load Balancing Clustering", [online], [Retrieved 2003], retrieved from the Internet at <URL: http://www.aspsys.com/clusters/load_balancing/>, 1 pp.

Boel, R.K. and J.H. Van Schuppen, "Distributed Routing for Load Balancing", Proceedings of the IEEE, vol. 77, No. 1, Jan. 1989, 12 pp.

Brocade Communication Systems Inc, "Improving System Availability With Storage Area Networks", 2001, 22 pp.

Cisco Systems Inc., "Cisco Load Balancing Solutions", F0_4553_c1, 1999, 50 pp.

Cisco Systems Inc., "High Availability for Cisco SN 5420: Storage Router-Based iSCSI Solutions", White Paper, 1999-2002, 32 pp.

Cisco Systems Inc., "High Availability Quick Look", White Paper, [Retrieved on Sep. 18, 2006], retrieved from the Internet at <URL: http://whitepapers.zdnet.co.uk>, 1 pg.

Cisco Systems, "Load Balancing: A Multifaceted Solution for Improving Server Availability", White Paper, 1998, 4 pp.

Cisco Systems, "MultiNode Load Balancing: Technical Documents", [online], 2002, [Retrieved 2003], retrieved from the Internet at <URL: http://www.cisco.com/warp/public/cc/pd/ibsw/mulb/tech/>, 1 pp.

Compaq Corp, "Intelligent Traffic Management—Global Load Balancing in a DISA Environment", Technical Guide, Feb. 2002, 23 pp.

Dot Hill Systems Corp., "SANpath v3.1 Software Product Description", 1999-2000, Jul. 2000—Revision A, 13 pp.

Falconstor, "Superior Resiliency, Availability, and Performance with IPStor DynaPath", White Paper, 2001, 9 pp.

Gopalan, K, T. Chiueh, and Y. Lin, "Load Balancing Routing with Bandwidth-Delay Guarantees", IEEE Communications Magazine, vol. 42, Iss. 6, Jun. 2004, 6 pp.

Heusse, M. and Y. Kermarrec, "Adaptive Routing and Load Balancing of Ephemeral Connections", Proceedings of the 1st European Conference on Universal Multiservice Networks, 2000, 9 pp.

"High-Availability Linux Project", [online], Sep. 24, 2003, [Retrieved 2003], retrieved from the Internet at <URL: http://www.linux-ha.org/>, 7 pp.

IEEE, "High Availability", [online], [Retrieved 2003], retrieved from the Internet at <URL: http://www.geocities.com/Paris/Musee/2712/tfcc.html>, 3 pp.

IEEE, "IEEE Std 802.3-2002", Part 3: Carrier Sense Multiple Access with Collision Detection (CSMA/CD) Access Method and Physical Layer Specifications, Mar. 8, 2002, 33 pp.

IEEE, "IEEE Std 802.11a-1999", Supplement to IEEE Standard for Information Technology, Part11: Wireless LAN Medium Access Control (MAC) and Physical Layer (PHY) Specifications: High-speed Physical Layer in the 5 GHz Band, 1999, 12 pp.

IEEE, "IEEE Std 802.11b-1999", Supplement to IEEE Standard for Information Technology, Part11: Wireless LAN Medium Access Control (MAC) and Physical Layer (PHY) Specifications: Higher-Speed Physical Layer Extension in the 2.4 GHz Band, Sep. 16, 1999, 17 pp.

IEEE, "IEEE Std 802.11g-2003", Amendment to IEEE Standard for Information Technology, Part11: Wireless LAN Medium Access Control (MAC) and Physical Layer (PHY) Specifications: Amendment 4: Further Higher Data Rat Extension in the 2.4 GHz Band, Jun. 27, 2003, 22 pp.

Information Sciences Institute, "Internet Protocol: DARPA Internet Program Protocol Specification", RFC 791, Sep. 1981, 45 pp.

Information Sciences Institute, "Transmission Control Protocol: DARPA Internet Program Protocol Specification", RFC 793, Sep. 1981, 80 pp.

Intel Corp., "Advanced Networking Services: Teaming", [online], 2003, [Retrieved 2003], retrieved from the Internet at <URL: http://support.intel.com/support/network/adapter/ans/teaming.htm>, 4 pp.

International Preliminary Report on Patentability, Sep. 28, 2006, for International Application No. PCT/RU2004/000105, 7 pp.

International Search Report and Written Opinion, Dec. 16, 2004, for International Application No. PCT/RU2004/000105, 13 pp.

Krueger, M., R. Haagens, C. Sapuntzakis, & M. Bakke, "Small Computer Systems Interface Protocol Over the Internet (iSCSI) Requirements and Design Considerations", RFC 3347, Jul. 2002, 23 pp.

Linuxcare, "T3 Multipath Failover System FAQ", [online], 2000, [Retrieved 2003], retrieved from the Internet at <URL: http://openprojects.linuxcare.com/t3/faq.html>, 3 pp.

Meinen, D., "High Availability Secure Path for Windows NT", Nov. 1999, 37 pp.

Mylex, "Clustering & Fibre Channel: Next Wave in PC Computing", printed on Oct. 22, 2003, 32 pp.

Neomar, "Neomar LBFO Module: When Wireless Means Business", printed on Oct. 22, 2003, 2 pp.

Notice of Allowance, Dec. 1, 2009, for Application No. JP2007500707, 4 pp. [English language translation of allowed claims attached].

Office Action 1, Feb. 15, 2008, for Application No. CN200480041815.9, 29 pp. [English language translation attached].

Office Action 1, Dec. 18, 2006, for Application No. GB0616648.2, 5 pp.

Office Action 1, Apr. 7, 2009, for Application No. JP2007-500707, 3 pp. [Translation].

Office Action 2, Aug. 1, 2008, for CN200480041815.9, 11 pp. [English Language Translation Attached].

Office Action 2, Jul. 27, 2007, for Application No. GB0616648.2, 4 pp.

Office Action 3, Jan. 24, 2008, for Application No. GB0616648.2, 5 pp.

Ottem, E., "SANs for High Availability Systems", WP-HA0201, 2001, 7 pp.

PCI-SIG "PCI-SIG Home Page, Specifications, and Newsroom," [online], © 2004, retrieved from the Internet at <URL: http://www.pcisig.com>, 18 pp.

QLogic Corp., "QLogic Fibre Channel Software: Enhancing Disk Adapter Performance, Function, and Control", White Paper, FC0132001-01 Rev B, May 2, 2000, 21 pp.

Response to Office Action 1, Jul. 3, 2008, for Application No. CN200480041815.9, 12 pp.

Response to Office Action 1, Jun. 18, 2007, for Application No. GB0616648.2, 10 pp.

Response to Office Action 1, Aug. 6, 2009, for Application No. JP2007500707, 17 pp. [English language translation of claims on file attached].

Response to Office Action 2, Oct. 20, 2008, for Chinese Application No. CN200480041815.9, 20 pp [English language translation of claims attached].

Response to Office Action 2, Nov. 12, 2007, for Application No. GB0616648.2, 6 pp.

Response to Office Action 3, Feb. 18, 2008, for Application No. GB0616648.2, 6 pp.

Ruan, L., H. Luo, and C. Liu, "A Dynamic Routing Algorithm With Load Balancing Heuristics for Restorable Connections in WDM Networks", IEEE Journal on Selected Areas in Communications, vol. 22, Iss. 9, Nov. 2004, 7 pp.

Satran, J., C. Sapuntzakis, M. Chadalapaka, and E. Zeidner, "iSCSI," Jan. 19, 2003, 51 pp.

Serial ATA, "Serial ATA 1.0a Specification," Serial ATA Specs and Design Guides, [online], Feb. 4, 2003, retrieved from the Internet at <URL: http://www.serialata.com>, 2 pp.

Serial ATA, "Serial ATA: High Speed Serialized AT Attachment," Revision1.0, Aug. 29, 2001, 37 pp.

Shanley, T., and D. Anderson, "PCI System Architecture", 4th edition, Chapters 1 & 2,Mindshare, Inc., 1999, 61 pp.

Sun Microsystems, Inc., "Sun Clusters", White Paper, Oct. 1997, 38 pp.

Sun Microsystems, Inc., "Sun Multipath Failover Driver 1.0 for Windows NT User's Guide", White Paper, Revision 01, Feb. 2001, 38 pp.

T10, "How to Get T10 Draft Standards (and Other Publications)", [online], [retrieved on Dec. 19, 2003], retrieved from the Internet at <URL: http://www.t10.org>, 3 pp.

T10, "Information Technology—SCSI Architecture Model—2 (SAM-2)", Project 1157-D, Revision 24, Sep. 12, 2002, 91 pp.

Thodime, G.P.V., V.M. Vokkarane, and J.P. Jue, "Dynamic Congestion-Based Load Balanced Routing in Optical Burst-Switched Networks", Proceedings of the IEEE Global Telecommunications Conference, vol. 5, Dec. 2003, 5 pp.

Weber, R., "It's the I_T Nexus, Stupid", 01-093r0, [Retrieved 2003], 2000, 11 pp.

Weber, R., M. Rajagopal, F. Travostino, M. O'Donnell, C. Monia, & M. Merhar, "Fiber Channel (FC) Frame Encapsulation", RFC 3643, Dec. 2003, 17 pp.

Yang, X., S. Zhou, M. Zhang, X. Tang, and J. Liu, "An Efficient QoS Routing Algorithm Based on Nonlinear Path Distance for Min-Sharing Interference and Load Balancing", Proceedings of the Fourth International Conference on Computer and Information Technology, 2004, 6 pp.

Yuen, M., W. Jia, and C. Cheung, "Simple Mathematical Modeling of Efficient Path Selection for QoS Routing in Load Balancing", Proceedings of the International Conference on Multimedia and Expo, vol. 1, Jun. 2004, 4 pp.

Zues Technology, "Building High Performance, High-Availability Clusters", Jun. 16, 2000, Version 1.0, 12 pp.

Abstract and Machine Translation for Publication No. JP2002-304331, Oct. 18, 2002, 12 pp.

Abstract for Publication No. RU2202123, Apr. 10, 2003, 1 pg.

Casetti, C., R. Lo Cigno, M. Mellia, "QoS-Aware Routing Schemes Based on Hierarchical Load-Balancing for Integrated Services Packet Networks", IEEE International Conference on Communications, 1999, 5 pp.

Elmallah, E.S., H.S. Hassanein, and H.M. AboElFotoh, "Supporting QoS Routing in Mobile Ad Hoc Networks Using Probabilistic Locality and Load Balancing", IEEE Global Telecommunications Conference, 2001, 6 pp.

Shan, Z., C. Lin, D.C. Marinescu, & Y. Yang, "Modeling and Performance Analysis of QoS-Aware Load Balancing of Web-Server Clusters", Computer Networks, 40, 2002, 22 pp.

Office Action 1, Jun. 14, 2010, for Application No. DE112004002797.7, 18 pp [English language translation attached].

Response to Office Action 1 and clean claims for DE112004002797, dated Nov. 2, 2010, 13 pp. [Includes Machine Translation of Clean Claims] (77.48DE ROA1).

Final Office Action 1 for U.S. Appl. No. 10/599,055, dated Jul. 9, 2009, 12 pp. [77.48 (FOA1)].

Notice of Allowance 1 for U.S. Appl. No. 10/599,055, dated Sep. 14, 2009, 6 pp. [77.48 (NOA1)].

Notice of Allowance 1 for U.S. Appl. No. 10/815,349, dated Nov. 18, 2009, 20 pp. [77.69 (NOA1)].

Notice of Allowance 2 for U.S. Appl. No. 10/599,055, dated Dec. 31, 2009, 10 pp. [77.48 (NOA2)].

Notice of Allowance 2 for U.S. Appl. No. 10/815,349, dated May 13, 2010, 21 pp. [77.69 (NOA2)].

Office Action 1 for U.S. Appl. No. 10/599,055, dated Dec. 12, 2008, 25 pp. [77.48 (OA1)].

Office Action 1 for U.S. Appl. No. 10/815,349, dated Oct. 12, 2007, 17 pp. [77.69 (OA1)].

Office Action 2 for U.S. Appl. No. 10/518,349, dated Apr. 4, 2008, 16 pp. [77.69 (OA2)].

Office Action 3 for U.S. Appl. No. 10/815,349, dated Oct. 15, 2008, 9 pp. [77.69 (OA3)].

Office Action 4 for U.S. Appl. No. 10/815,349, dated Apr. 8, 2009, 13 pp. [77.69 (OA4)].

Preliminary Amendment for U.S. Appl. No. 10/599,055, dated Sep. 18, 2006, 12 pp. [77.48 (PrelimAmend)].

Response to Final Office Action 1 for U.S. Appl. No. 10/599,055, dated Aug. 31, 2009, 7 pp. [77.48 (RFOA1)].

Response to Office Action 1 for U.S. Appl. No. 10/599,055, dated Apr. 10, 2009, 13 pp. [77.48 (ROA1)].

Response to Office Action1 for U.S. Appl. No. 10/815,349, dated Jan. 14, 2008, 17 pp. [77.69 (ROA1)].

Response to Office Action 2 for U.S. Appl. No. 10/815,349, dated Jul. 7, 2008, 20 pp. [77.69 (ROA2)].

Response to Office Action 3 for U.S. Appl. No. 10/815,349, dated Jan. 15, 2009, 14 pp. [77.69 (ROA3)].

Response to Office Action 4 for U.S. Appl. No. 10/815,349, dated Jul. 8, 2009, 15 pp. [77.69 (ROA4)].

Supplemental Notice of Allowability for U.S. Appl. No. 10/815,349, dated Jan. 13, 2010, 4 pp. [77.69 (SuppNOA)].

Translation of Claims at Response to Office Action 1 for DE Application No. 112004002797.7-53, dated Nov. 2, 2010, 6 pp. [77.48DE (Claims at ROA1)].

* cited by examiner

FAILOVER AND LOAD BALANCING

CROSS-REFERENCE TO RELATED APPLICATIONS

This application is a divisional of and claims the benefit of "FAILOVER AND LOAD BALANCING USING A FILTER DRIVER AND A MINIPORT DRIVER", having application Ser. No. 10/599,055, filed Sep. 18, 2006, which is a National Stage filing under 35 U.S.C. §371 of International Application No. PCT/RU2004/000105, filed on Mar. 19, 2004, the entire contents of each of which is incorporated herein by reference.

BACKGROUND

1. Field

The disclosure relates to a method, system, and program for failover and load balancing.

2. Description of the Related Art

An I_T nexus is a pairing of an initiator device and a target device. The devices that request input/output (I/O) operations are referred to as initiators and the devices that perform these operations are referred to as targets. For example, a host computer may be an initiator, and a storage device may be a target. The target may include one or more separate storage devices.

A Host Bus Adapter (HBA) is a hardware device that "connects" the operating system and a Small Computer System Interface (SCSI) bus. The HBA manages the transfer of data between the host computer and the communication path. HBA teaming refers to grouping together several HBAs to form a "team," where each HBA in a team is connected and may route data to a particular target. HBA teams may be built on an Internet Small Computer System Interface (iSCSI) (IETF RFC 3347, published February 2003) portal group concept. iSCSI has been defined as a standard by IETF February 2003. A portal group concept may be described as a collection of Network Portals within an iSCSI Network Entity that collectively support the capability of coordinating a session with connections spanning these portals.

HBA teaming may be used with Small Computer System Interface (SCSI) (American National Standards Institute (ANSI) SCSI Controller Commands-2 (SCC-2) NCITS.318: 1998) initiators running Windows® 2000, Windows® XP, or Windows® .NET operating systems. The connection recovery strategy of an I_T nexus may be based on multiple Transmission Control Protocol (TCP) connections (Internet Engineering Task Force (IETF) Request for Comments (RFC) 793, published September 1981). That is, packets from iSCSI initiators running on Windows® operating systems are transmitted and/or received through multiple connections between an initiator and a target. If multiple connections to the same target are established within one HBA, then a miniport driver may handle failover (i.e., when one connection fails, routing packets to another connection) and load balancing (i.e., balancing the load among the HBA connections).

However, there is a need in the art for failover and load balancing across several HBAs, each of which may have one or more connections to the same target.

BRIEF DESCRIPTION OF THE DRAWINGS

Referring now to the drawings in which like reference numbers represent corresponding parts throughout.

DETAILED DESCRIPTION OF THE EMBODIMENTS

In the following description, reference is made to the accompanying drawings which form a part hereof and which illustrate several embodiments. It is understood that other embodiments may be utilized and structural and operational changes may be made without departing from the scope of embodiments.

Figure 1A:
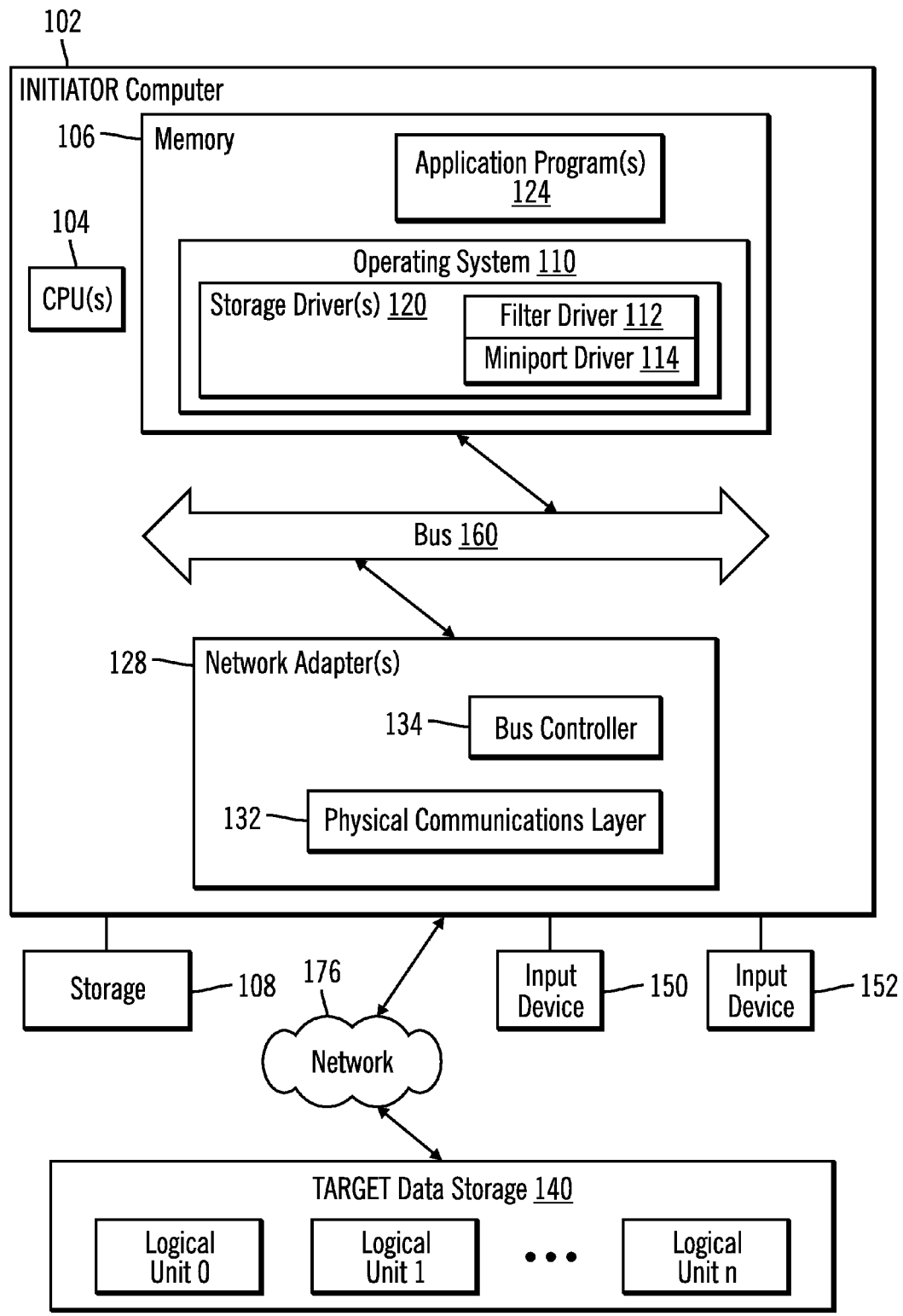
FIG. 1A illustrates a computing environment in which certain embodiments are implemented.

FIG. 1A illustrates a computing environment in which embodiments may be implemented. A computer 102 acts as an initiator, while data storage 140 acts as a target to form an I_T nexus. Computer 102 includes one or more central processing units (CPUs) 104, a volatile memory 106, non-volatile storage 108 (e.g., magnetic disk drives, optical disk drives, a tape drive, etc.), operating system 110 (e.g., Windows® 2000, Windows® XP, or Windows® .NET), and one or more network adapters 128. In certain embodiments, each network adapter is a Host Bus Adapter (HBA). A filter driver 112, a miniport driver 114, and an application program 124 further execute in memory 106.

The computer 102 may comprise a computing device known in the art, such as a mainframe, server, personal computer, workstation, laptop, handheld computer, etc. Any CPU 104 and operating system 110 may be used. Programs and data in memory 106 may be swapped into storage 108 as part of memory management operations.

The data storage 140 includes one or more logical units (i.e., "n" logical units, where "n" may be any positive integer value, which in certain embodiments, is less than 128). Merely for ease of understanding, logical unit 0, logical unit 1, and logical unit "n" are illustrated. Each logical unit may be described as a separate storage device. Additionally, a logical unit number (LUN) is associated with each logical device. In certain embodiments, an HBA team is organized based on the target and LUN (i.e., each HBA that can route data to a particular LUN of a target is grouped into one HBA team), and one HBA may belong to different HBA teams.

Each network adapter 128 includes various components implemented in the hardware of the network adapter 128. Each network adapter 128 is capable of transmitting and receiving packets of data over network 176, which may comprise a Local Area Network (LAN), the Internet, a Wide Area Network (WAN), Storage Area Network (SAN), WiFi (Institute of Electrical and Electronics Engineers (IEEE) 802.11b, published Sep. 16, 1999), Wireless LAN (IEEE 802.11b, published Sep. 16, 1999), etc.

Storage drivers 120 execute in memory 106 and include network adapter 128 specific commands to communicate with each network adapter 128 and interface between the operating system 110 and each network adapter 128. A network adapter 128 and storage driver 120 implement logic to process iSCSI packets, where a SCSI command is wrapped in the iSCSI packet, the iSCSI packet is wrapped in a TCP packet. The transport protocol layer unpacks the payload from the received Transmission Control Protocol (TCP) (Internet Engineering Task Force (IETF) Request for Comments (RFC) 793, published September 1981) packet and transfers the data to the storage driver 120 to return to, for example the application program 124. Further, an application program 124 transmitting data transmits the data to the storage driver 120, which then sends the data to the transport protocol layer to package in a TCP/IP packet before transmitting over the network 176.

A bus controller 134 enables each network adapter 128 to communicate on a computer bus 160, which may comprise any bus interface known in the art, such as a Peripheral Component Interconnect (PCI) bus, PCI express bus, Industry Standard Architecture (ISA), Extended ISA, MicroChannel Architecture (MCA), etc. The network adapter 128 includes a physical communication layer 132 for implementing Media Access Control (MAC) functionality to send and receive network packets to and from remote data storages over a network 176. In certain embodiments, the network adapter 128 may implement the Ethernet protocol (IEEE std. 802.3, published Mar. 8, 2002), Fibre Channel (IETF RFC 3643, published December 2003), or any other network communication protocol known in the art.

The storage 108 may comprise an internal storage device or an attached or network accessible storage. Programs in the storage 108 are loaded into the memory 106 and executed by the CPU 104. An input device 150 is used to provide user input to the CPU 104, and may include a keyboard, mouse, pen-stylus, microphone, touch sensitive display screen, or any other activation or input mechanism known in the art. An output device 152 is capable of rendering information transferred from the CPU 104, or other component, such as a display monitor, printer, storage, etc.

In certain embodiments, in addition to the storage drivers 120, the computer 102 may include other drivers.

The network adapter 128 may include additional hardware logic to perform additional operations to process received packets from the computer 102 or the network 176. Further, the network adapter 128 may implement a transport layer offload engine (TOE) to implement the transport protocol layer in the network adapter as opposed to the computer storage driver 120 to further reduce computer 102 processing burdens. Alternatively, the transport layer may be implemented in the storage driver or other drivers 120 (for example, provided by an operating system).

Various structures and/or buffers (not shown) may reside in memory 106 or may be located in a storage unit separate from the memory 106 in certain embodiments.

Figure 1B:
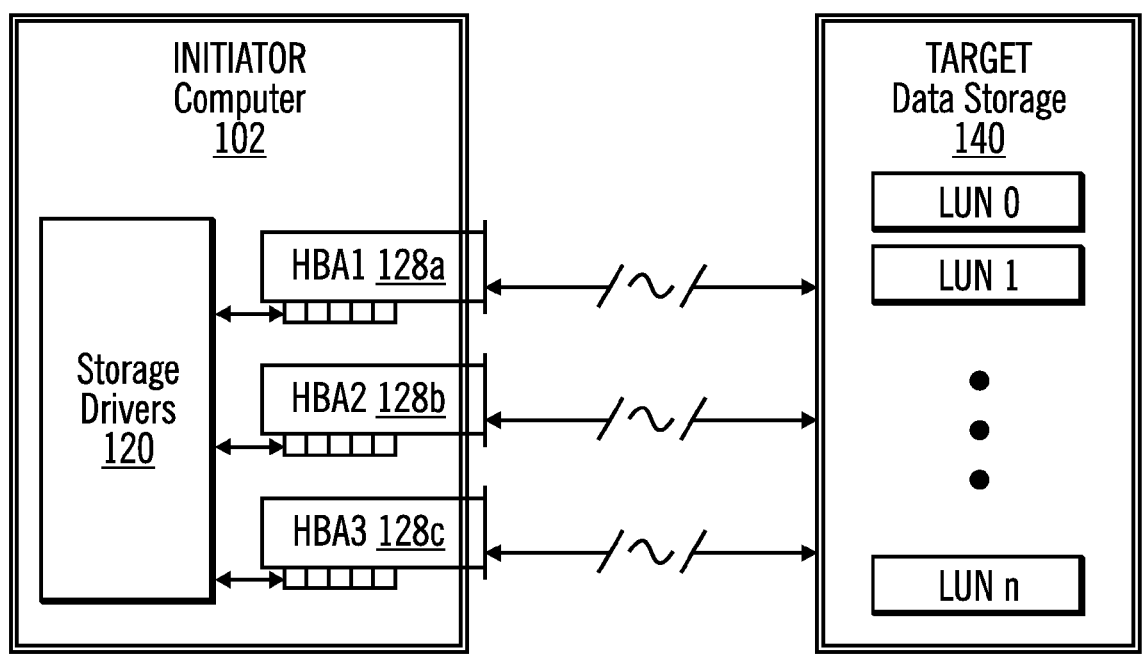
FIG. 1B illustrates a computing environment in which certain specific embodiments are implemented.

FIG. 1B illustrates a computing environment in which certain specific embodiments are implemented. In FIG. 1B, computer 102 includes storage drivers 120 interacting with Host Bus Adapters (HBAs) 128a, 128b, and 128c. Each HBA 128a, 128b, and 128c may be described as a network adapter 128 (FIG. 1A). The computer 102 and HBAs 128a, 128b, and 128c may be described as initiator, while the data storage 140 may be described as a target. The data storage 140 illustrates Logical Unit Numbers (LUNs) that represent logical units.

Figure 2A:
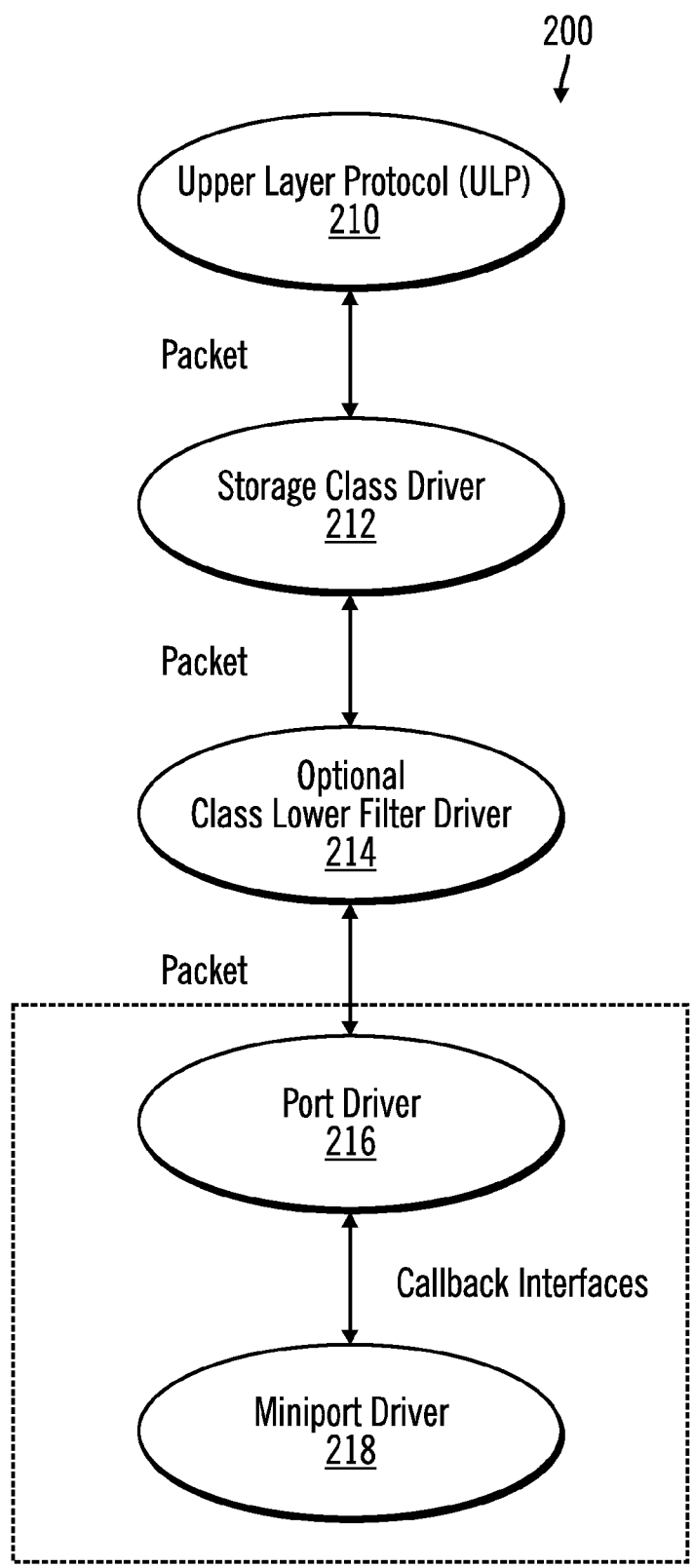
FIG. 2A illustrates, in a block diagram, a Windows® storage device drivers stack with an optional Class lower filter driver.

FIG. 2A illustrates, in a block diagram, a Windows® storage device drivers stack 200 with optional Class lower filter driver. The storage device driver stack 200 includes an upper layer protocol (ULP) 210, which may send packets to and receive packets from a storage class driver 212. The storage class driver 212 may send packets to and receive packets from a class lower filter driver 214. The class lower filter driver 214 is optional in certain embodiments. The class lower filter driver 214 may send packets to and receive packets from a port driver 216. The port driver 216 communicates with a miniport driver 218. The miniport driver 218 is able to communicate with the class lower filter driver 214 via callback interfaces which are provided by embodiments.

Embodiments provide a special filter driver based on the class lower filter driver 214 above the port driver 216 to provide for failover and load balance between cross-HBA connections. The filter driver handles HBA context-switching and path control. The filter driver also provides packet distribution. In particular, the filter driver sniffs SCSI Request Blocks (SRBs) packets included in Input/Output Request Packets (IRPs) between the storage class driver 212 and port driver 216. In certain embodiments, the filter driver is implemented as a lower-level class filter driver. The filter driver is notified as soon as a storage device instance is created, and then, the filter driver attaches itself to the storage driver stack 200 under the class lower filter driver 214.

Figure 2B:
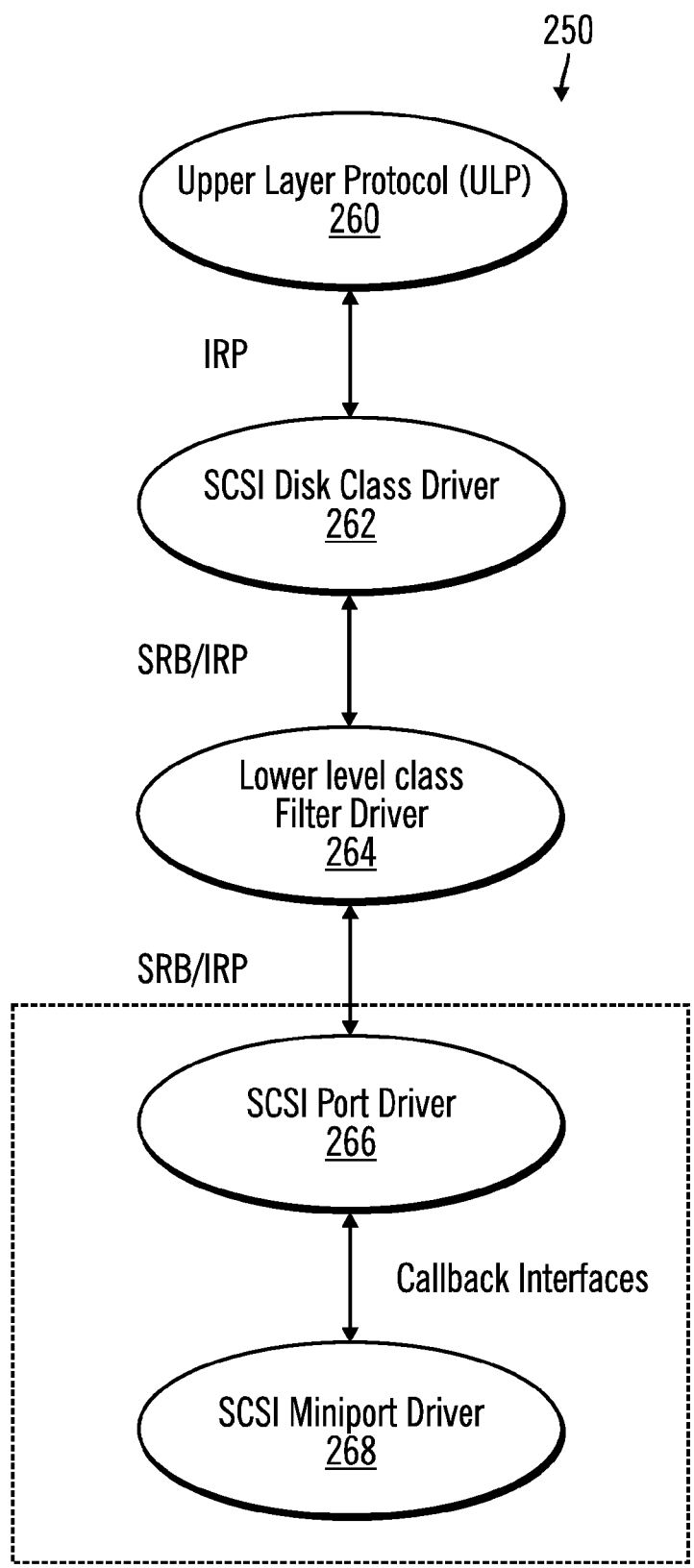
FIG. 2B illustrates, in a block diagram, a storage device drivers stack with failover and load balancing capabilities that may be used in a SCSI environment in accordance with certain embodiments.

FIG. 2B illustrates, in a block diagram, a storage device drivers stack 250 with failover and load balancing capabilities that may be used in a SCSI environment in accordance with certain embodiments. The storage device drivers stack 250 may be used with a Windows® 2000, Windows® XP or Windows® .NET operating system. The storage device drivers stack 250 includes an upper layer protocol (ULP) 260, which may send IRPs to and receive IRPs from a SCSI disk class driver 262. The SCSI disk class driver 262 may send SRBs/IRPs to and receive SRB/IRP from a lower level class filter driver 264. The lower level class filter driver 264 may send SRBs/IRPs to and receive SRBs/IRPs from a SCSI port driver 266. The SCSI port driver 266 communicates with a SCSI miniport driver 268. The SCSI miniport driver 268 is able to communicate with the lower level class filter driver 264 via callback interfaces.

Figure 3:
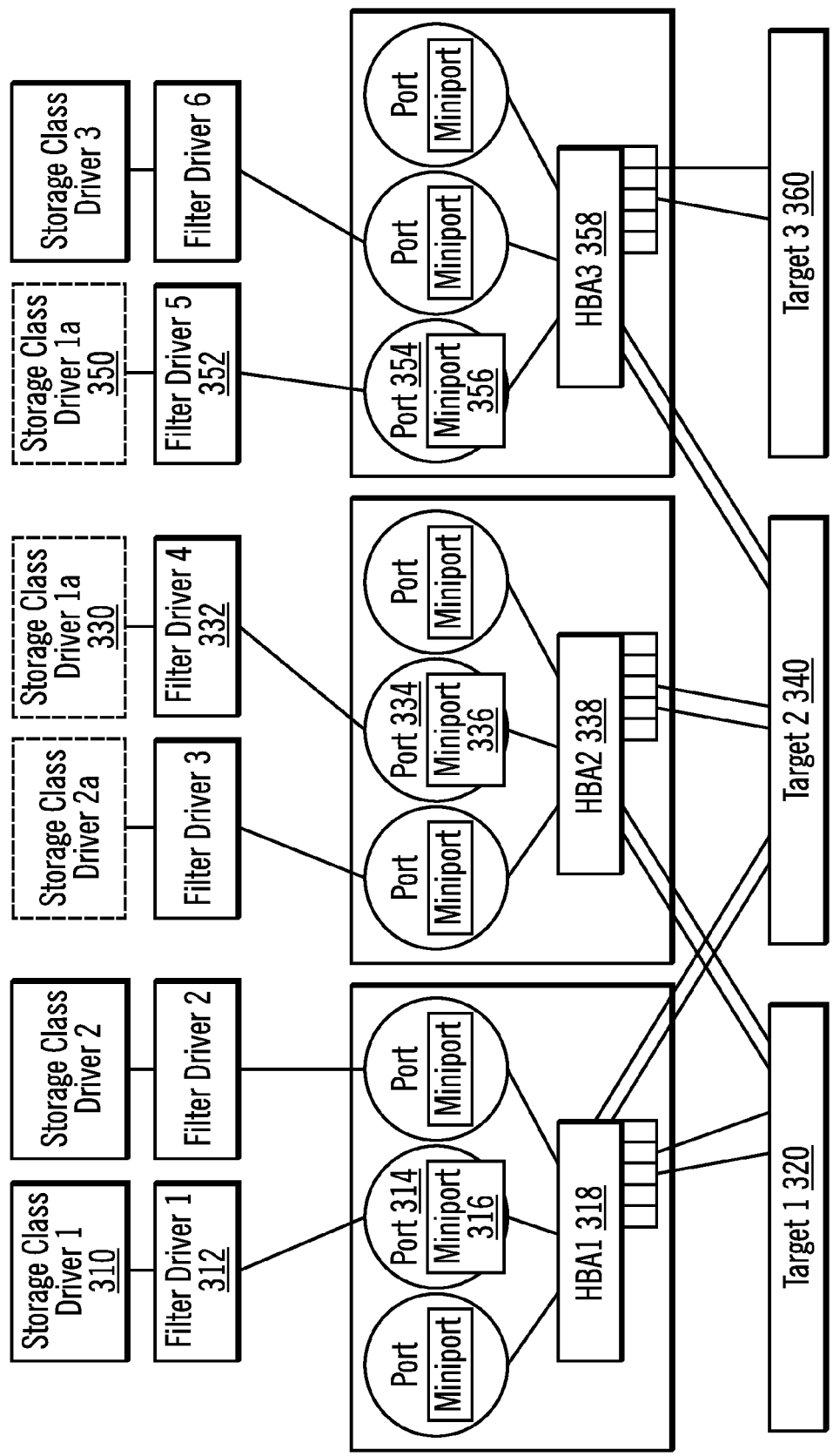
FIG. 3 illustrates, in a block diagram, an example of configuration of an initiator with failover and load balancing capabilities in accordance with certain embodiments.

FIG. 3 illustrates, in a block diagram, an example of configuration of an initiator with failover and load balancing capabilities in accordance with certain embodiments. In FIG. 3, storage class drivers communicate with a filter driver, which communicates with a port/miniport driver. For example, a storage class driver communicates with a filter driver using storage class driver1 device object 310 and filter driver1 device object 312, the filter driver communicates with a port/miniport driver using filter driver1 device object 312 and port/miniport driver device object 316, 314. A miniport driver communicates with an HBA via port driver exported routines. Each HBA has communication paths to one or more targets. For example, HBA1 318 has communication paths to target1 320 and target2 340. HBA2 338 has communication paths to target1 320 and target2 340. HBA3 358 has communication paths to target2 340 and target3 360. Embodiments provide failover and load balancing across HBAs 318, 338, and 358, some of which have connections to a same target. In certain embodiments, the proposed failover and load balancing approach is based on HBA teaming, built on an iSCSI portal group concept.

Again, in certain embodiments, an HBA team is organized based on the target and LUN (i.e., each HBA that can route data to a particular LUN of a target is grouped into one HBA team), and one HBA may belong to different HBA teams. For example, data may pass through data paths including filter driver1 device object 312, filter driver4 device object 332, and filter driver5 device object 352 to a same LUN (not shown) within target2 340. Each of these data paths passes through a different HBA (HBA1 318, HBA2 338, and HBA3 358, respectively), and so HBA1 318, HBA2 338, and HBA3 358 are in one HBA team. That is, for each HBA in an HBA team, data routed to a LUN within target 2 340 may flow through any HBA in the HBA team (for failover) or may flow through each of the HBAs in the HBA team simultaneously (for load balancing). As another example, an HBA team is also formed by HBA1 318 and HBA2 338, because corresponding data paths pass through HBA1 318 and HBA2 338 to a LUN (not shown) in target1 320.

Embodiments provide new callback interfaces for implementing failover and load balancing capabilities in a filter driver.

The failover techniques provide high availability of communication paths to a target when a first HBA or data path thought the first HBA fails (i.e., packets are routed to a second HBA that is connected to the same target). For failover, embodiments provide secondary storage device stack hiding and a notification mechanism.

Figure 4A:
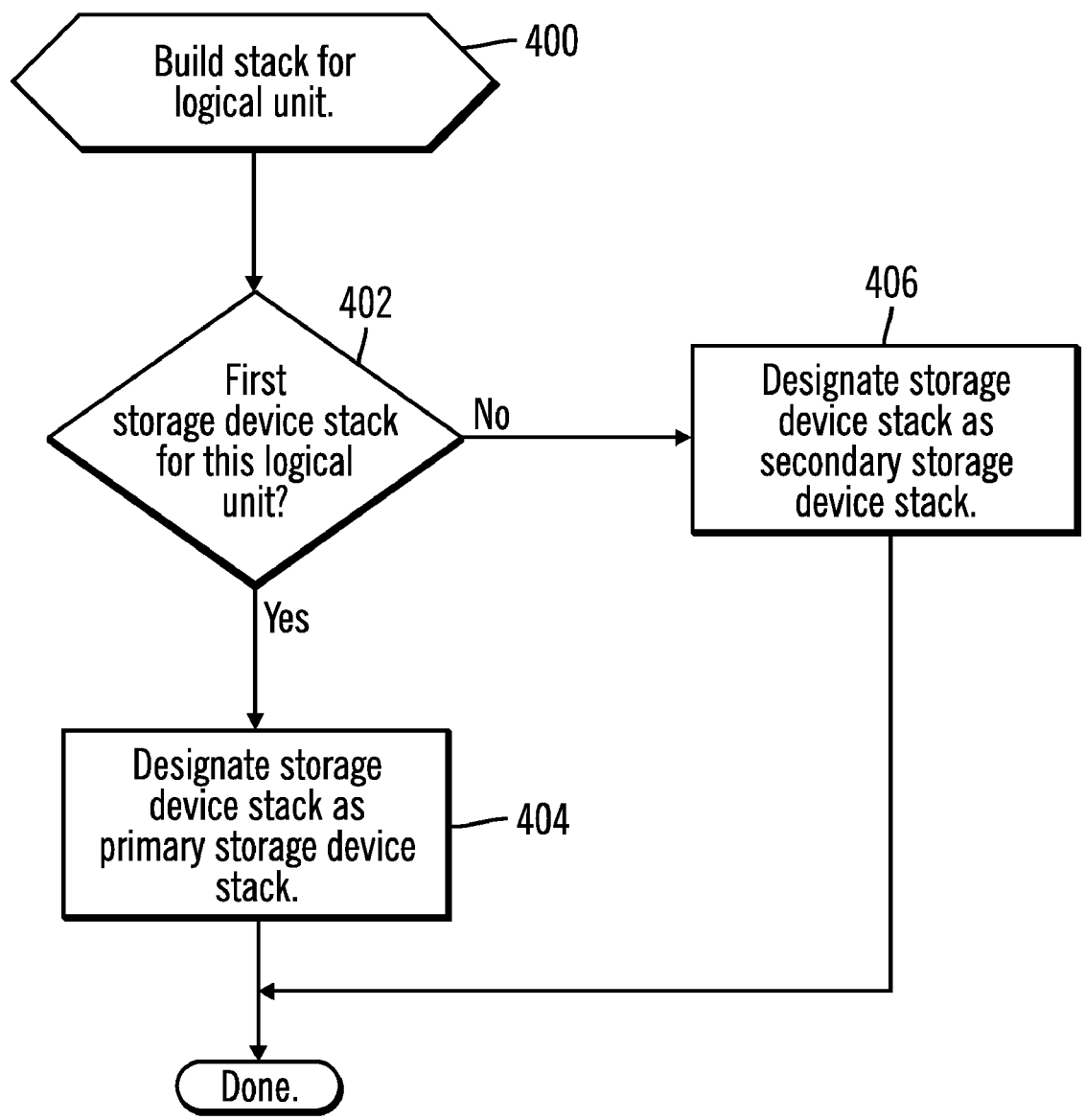
FIGS. 4A and 4B illustrate operations for secondary storage device stack hiding in accordance with certain embodiments.
Figure 4B:
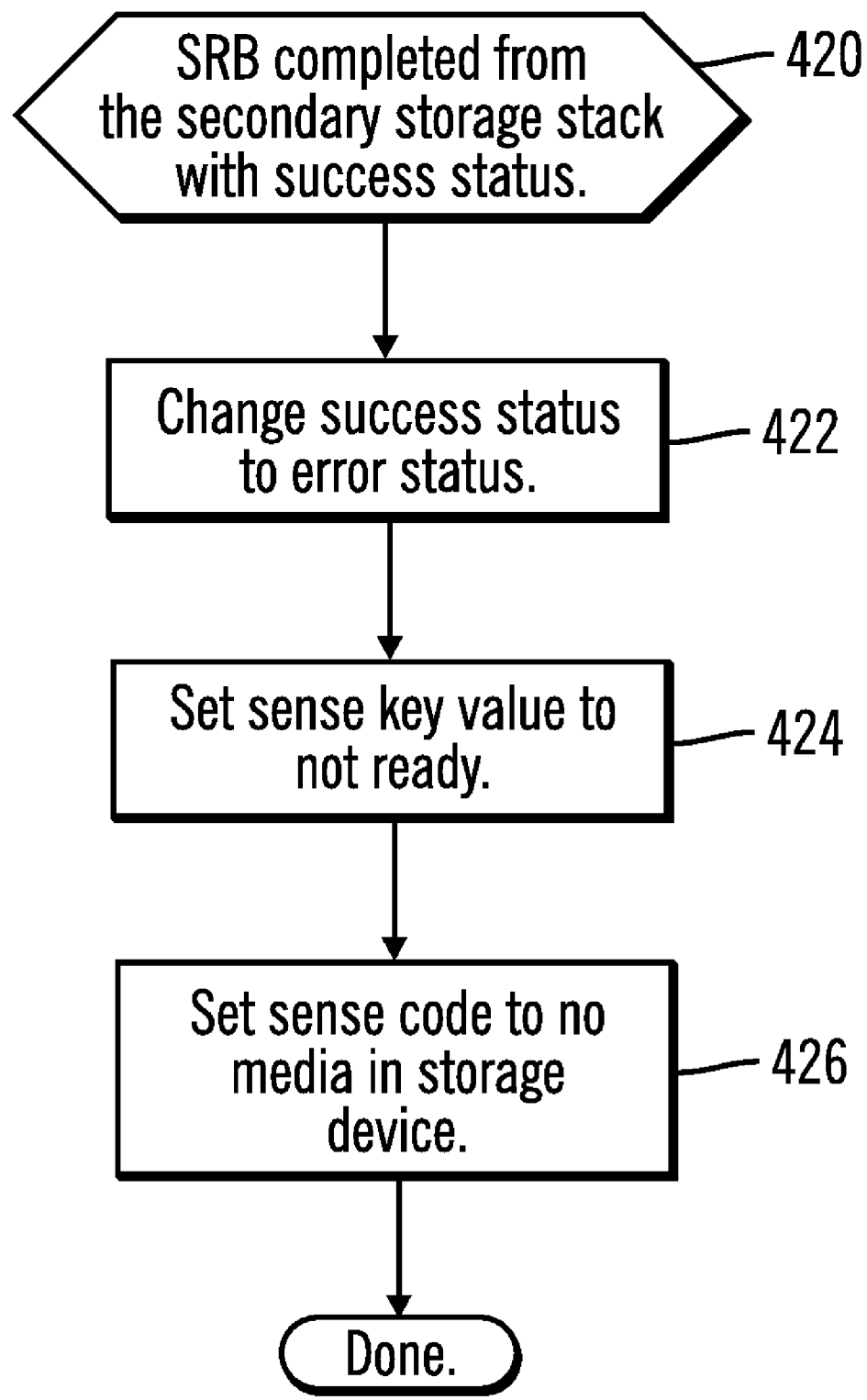

FIGS. 4A and 4B illustrate operations for secondary storage device stack hiding in accordance with certain embodiments. Control begins at block 400 with a storage device stack being built for a logical unit. In block 402, it is determined whether this is the first storage device stack for this logical unit. If so, processing continues to block 404, otherwise, processing continues to block 406. That is, when there are several HBAs connected to the same target, a storage device stack is created for each SCSI LUN of the target for each of the HBAs to enable the filter driver to handle and redirect SRBs for each HBA. If the file system were to mount on each of the storage device stacks being built for the same target, this can lead to synchronization problems due to multiple accesses to the same storage device instance. Therefore, the first storage device stack built for each LUN becomes a "primary" storage device stack. After that, all other storage device stacks built for the LUN are treated as "secondary" storage device stacks. So, in block 404, the storage device stack is designated as a primary storage device stack. In block 406, the storage device stack is designated as a secondary storage device stack.

For example, the storage device stack of storage class driver1 device object 310, filter driver1 device object 312, port/miniport driver device object 314, 316 is designated a primary storage device stack in this example. The storage device stack of storage class driver 1a device object 330, filter driver4 device object 332, port/miniport driver device object 334, 336 is designated a secondary storage device stack in this example. The storage device stack of storage class driver 1a device object 350, filter driver5 device object 352, port/miniport driver device object 354, 356 is designated a secondary storage device stack in this example. The filter driver enables file system mounting on one, primary storage device stack (e.g., storage device stack 310, 312, 314, and 316) and prevents file system mounting on the other, secondary storage device stacks (e.g., storage device stack 330, 332, 334, and 336 and storage device stack 350, 352, 354, and 356). Likewise, the storage device stack starting with storage class driver2 device object is a primary storage device stack, while the storage device stack starting with storage class driver 2a device object is a secondary storage device stack. Because of secondary storage device stack hiding, data is routed through the primary storage device stacks and not through the secondary storage device stacks.

In FIG. 4B, control begins at block 420 with a packet being completed from a secondary storage device stack with success status. In block 422, the filter driver changes the success status to an error status. In block 424, the filter driver sets the sense key value to not ready. In block 426, the filter driver sets the sense code to indicate that no media is in the storage device. Thus, in certain embodiments, to prevent the file system mounting on the secondary storage device stacks, the filter driver flips the status of SRBs completed from the secondary storage device stacks with success status to error status (e.g., SRB_STATUS_ERROR), sets a sense key value to SCSI_SENSE_NOT_READY and sets an additional sense code to SCSI_ADSENSE_NO_MEDIA_IN_DEVICE.

Figure 5A:
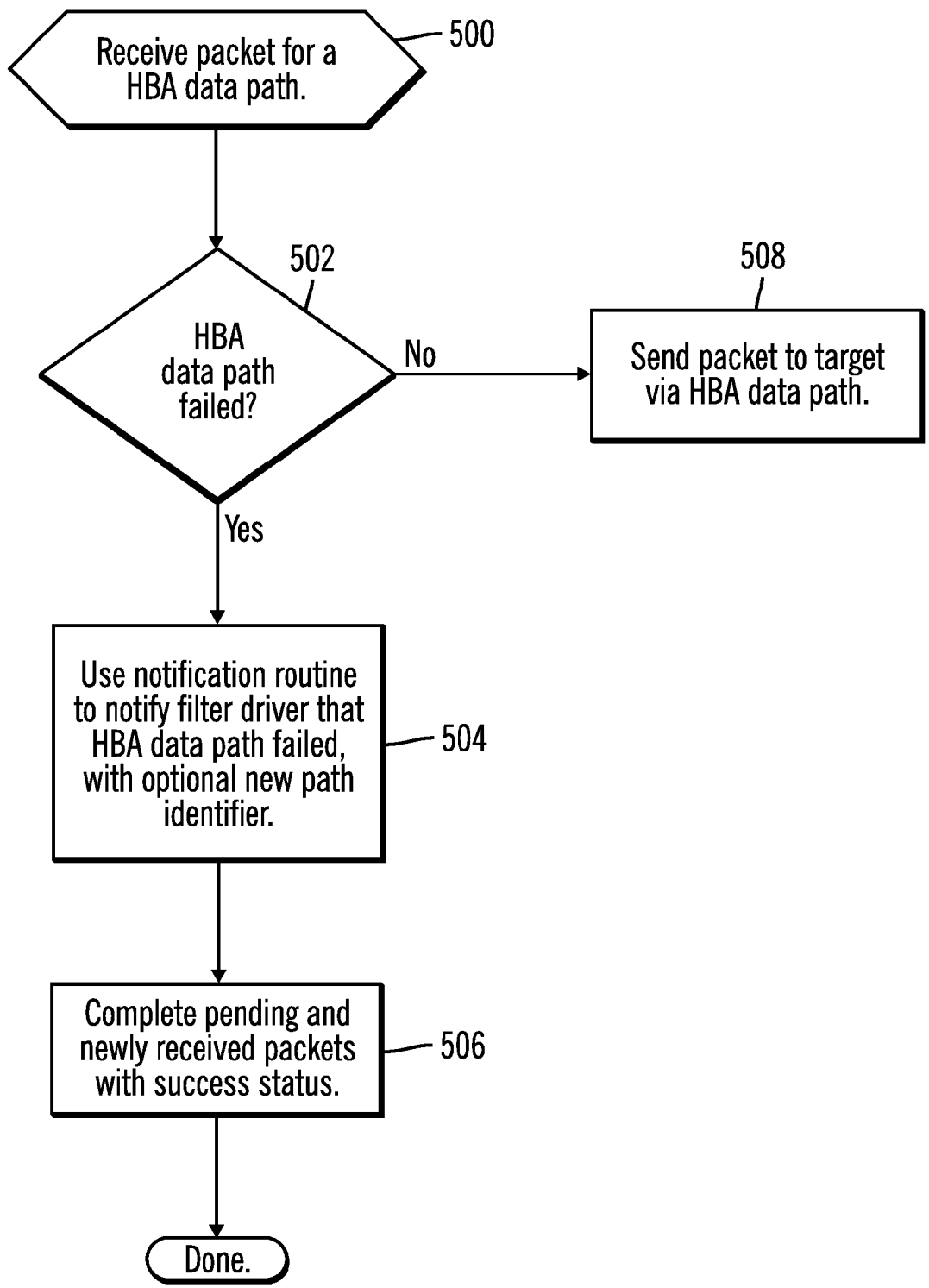
FIGS. 5A, 5B, and 5C illustrate operations for a notification mechanism in accordance with certain embodiments.
Figure 5B:
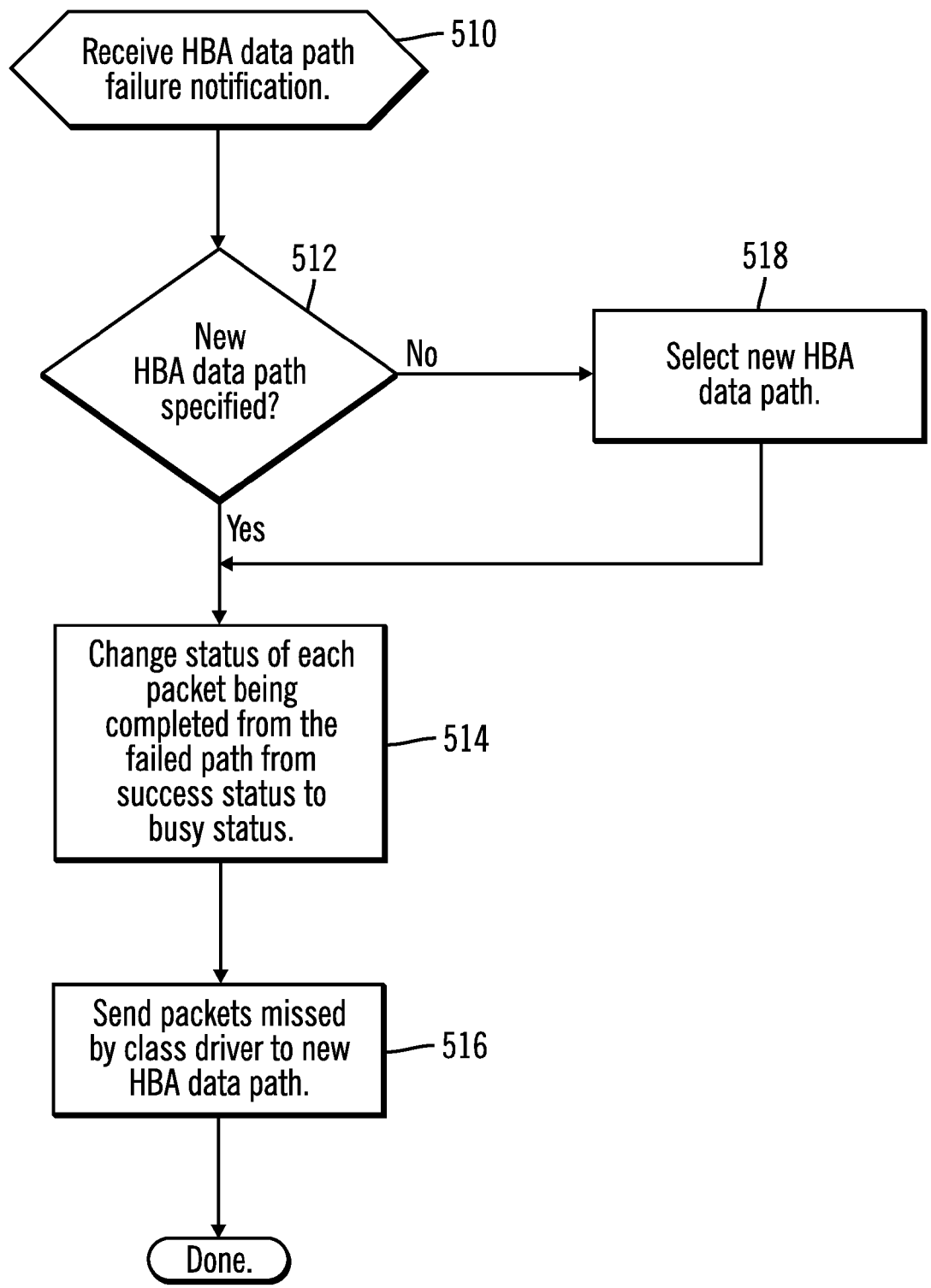
Figure 5C:
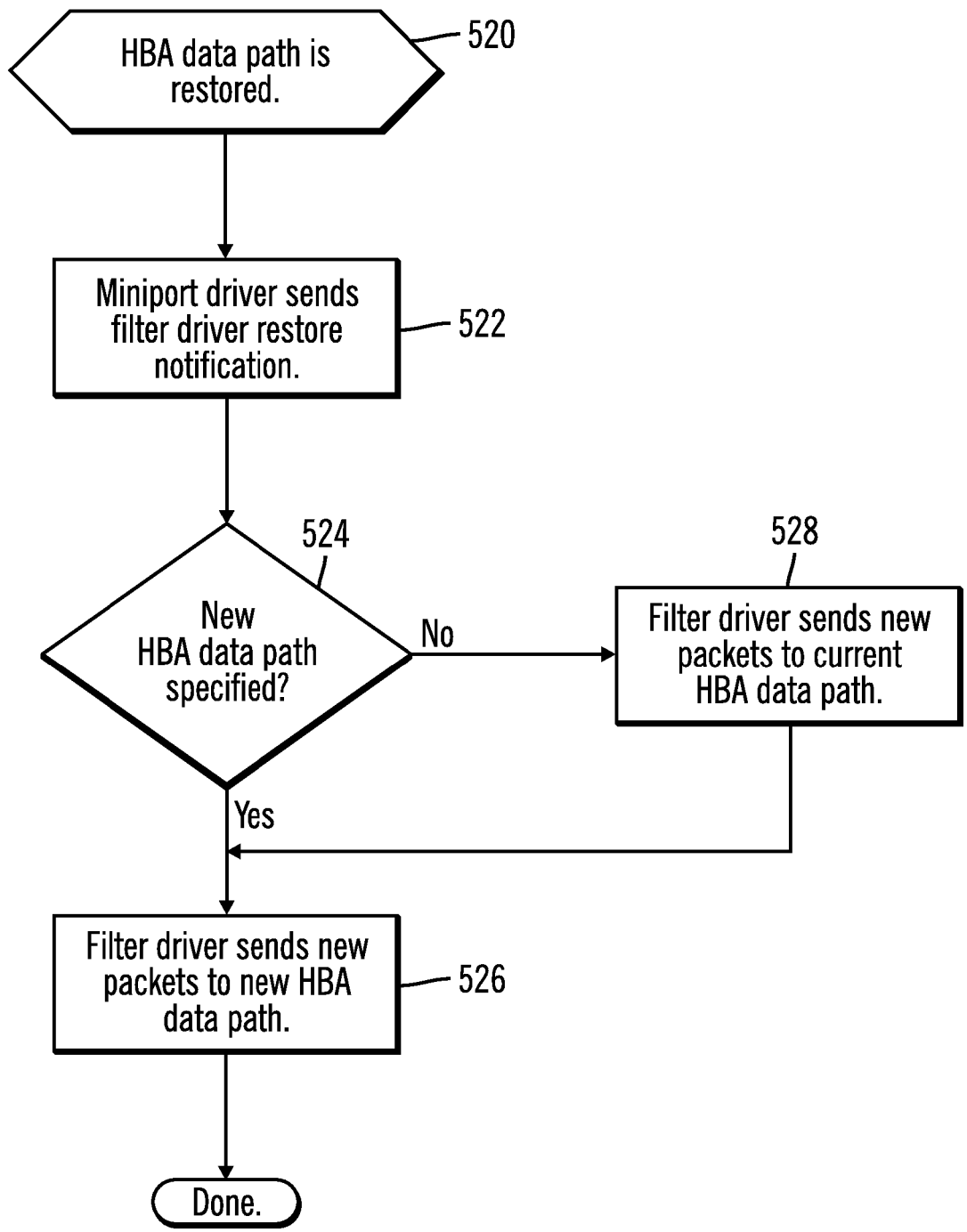

FIGS. 5A, 5B, and 5C illustrate operations for a notification mechanism in accordance with certain embodiments. The filter driver and miniport driver implement a protocol for interaction with each other.

FIG. 5A illustrates operations for failover processing implemented in a miniport driver in accordance with certain embodiments. In FIG. 5A, control begins at block 500 with receipt of a packet for a particular HBA data path at the miniport driver. The term "HBA data path" may be described as a data path from a miniport via an HBA to a target. One type of packet may be an SRB. In block 502, if the HBA data path has failed, the processing continues to block 504, otherwise, processing continues to block 508.

In block 504, the miniport driver uses the notification callback method to notify the filter driver that the HBA data path has failed. Optionally, the miniport driver provides a new HBA data path identifier to the filter driver, and the filter driver redirects packets to this new HBA data path. For example, for the HBA team formed by HBA1 318, HBA2 338, and HBA3 358, if HBA1 318 fails, the miniport may specify a new HBA data path including either HBA2 338 or HBA3 358. In certain embodiments, a pointer to the notification callback method and a pointer to the filter device extension for a current HBA data path may be sent to the miniport driver via an I/O control (IOCTL) in an add device method of the filter driver. In certain embodiments, when a HBA data path fails, the miniport driver notifies the filter driver of the HBA data path fail by calling the notification callback method with a status parameter and with a pointer parameter, where the pointer points to the device extension of the filter driver, corresponding to the current path.

The miniport driver does not complete packets with error status as this may cause the port driver to freeze an SRB queue or initiate a bus reset. Instead, in block 506, the miniport driver completes the pending (i.e., outstanding) and newly received packets for the failed HBA data path with a success status. In block 508, since the HBA data path has not failed, the miniport driver sends the packet to the target via the HBA data path.

For example, if a SRB is received at miniport 316 for routing to HBA1 318, and if HBA1 318 has failed, then the miniport driver 316 completes all pending SRBs for HBA1 318 as part of the protocol to notify the filter driver 312 to redirect the SRBs to another HBA. For instance, the filter driver 312 may redirect the SRBs to HBA2 338 or HBA3 358.

FIG. 5B illustrates operations implemented in a filter driver for failover processing in accordance with certain embodiments. Control begins at block 510 with the filter driver receiving a HBA data path failure notification. In block 512, if a new HBA data path identifier is specified by the miniport driver, processing continues to block 514, otherwise, processing continues to block 518. In block 514, the filter driver changes the status of each packet being completed from the failed path from success status to busy status. This change in status causes the class driver to reissue the packets. When the packets are reissued, the filter driver treats them as new requests and, if possible, redirects them to a new path.

In block 516, the filter driver sends packets missed by the class driver to the specified HBA data path. In block 518, since a new path identifier is not specified, then the filter driver selects a new path. In certain embodiments, if there is just one path in an HBA team, the filter driver continues to send new packets to the failed HBA data path (e.g., working in PATH THROUGH mode).

FIG. 5C illustrates operations implemented in a miniport driver when an HBA is restored in accordance with certain embodiments. Control begins at block 520 with a HBA data path being restored (e.g., an HBA is brought online or an HBA or data path through this HBA that had previously failed is restored). When a HBA data path has restored, the miniport driver notifies the filter driver by calling the notification callback method (block 522). In certain embodiments, the miniport driver notifies the filter driver of the HBA data path restoration by calling the notification callback method with a status parameter and with a pointer parameter, where the pointer points to the device extension of the filter driver, corresponding to the current path. The miniport driver may also pass the filter driver a new path identifier to which the filter driver should redirect new packets. In block 524, if a new HBA data path is specified, processing continues to block 526, otherwise, processing continues to block 528.

After the restore notification, if a new HBA data path is specified, the filter driver sends the new packets to the new HBA data path (block 526). If no new HBA data path is specified, the filter driver continues to send the packets on the current active path.

In additional to failover processing, embodiments provide a filter driver for balancing of I/O workload across multiple HBA data paths spanning multiple HBAs. Embodiments provide static load balancing and dynamic load balancing.

Figure 6A:
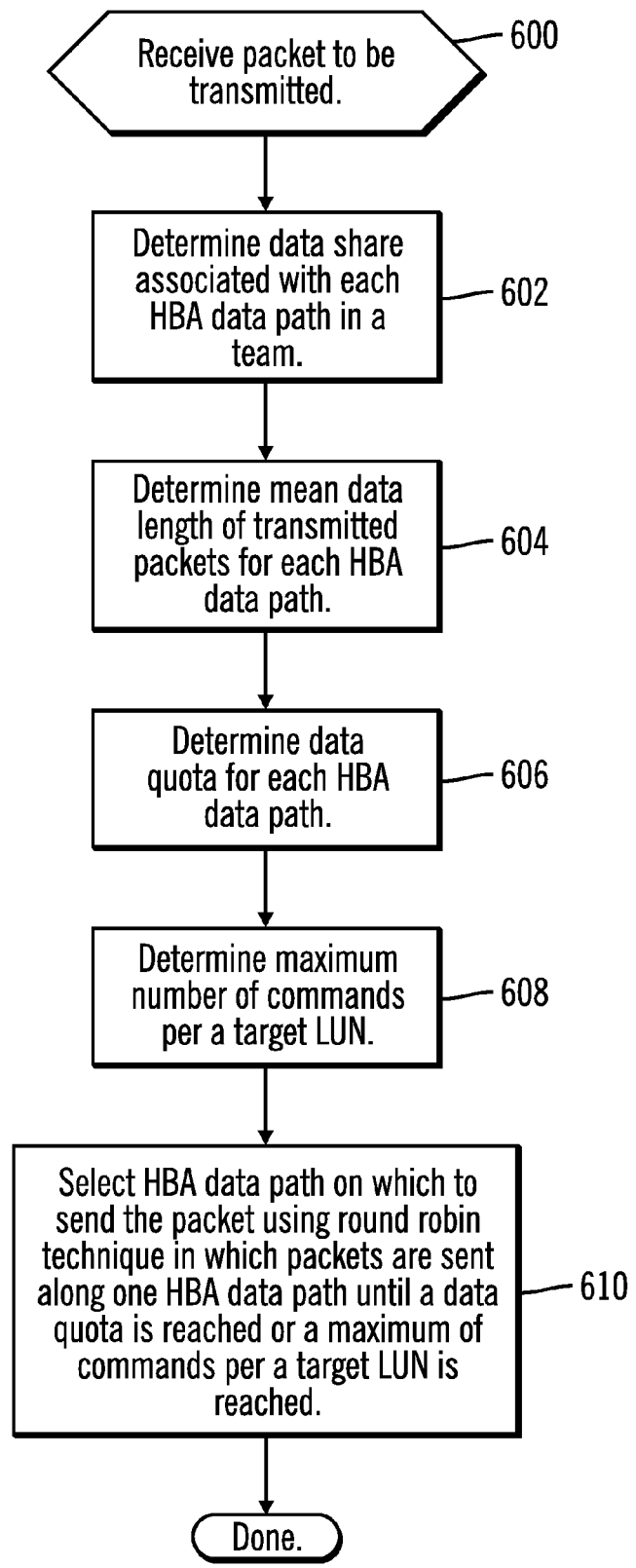
FIGS. 6A and 6B illustrate operations for load balancing in accordance with certain embodiments.
Figure 6B:
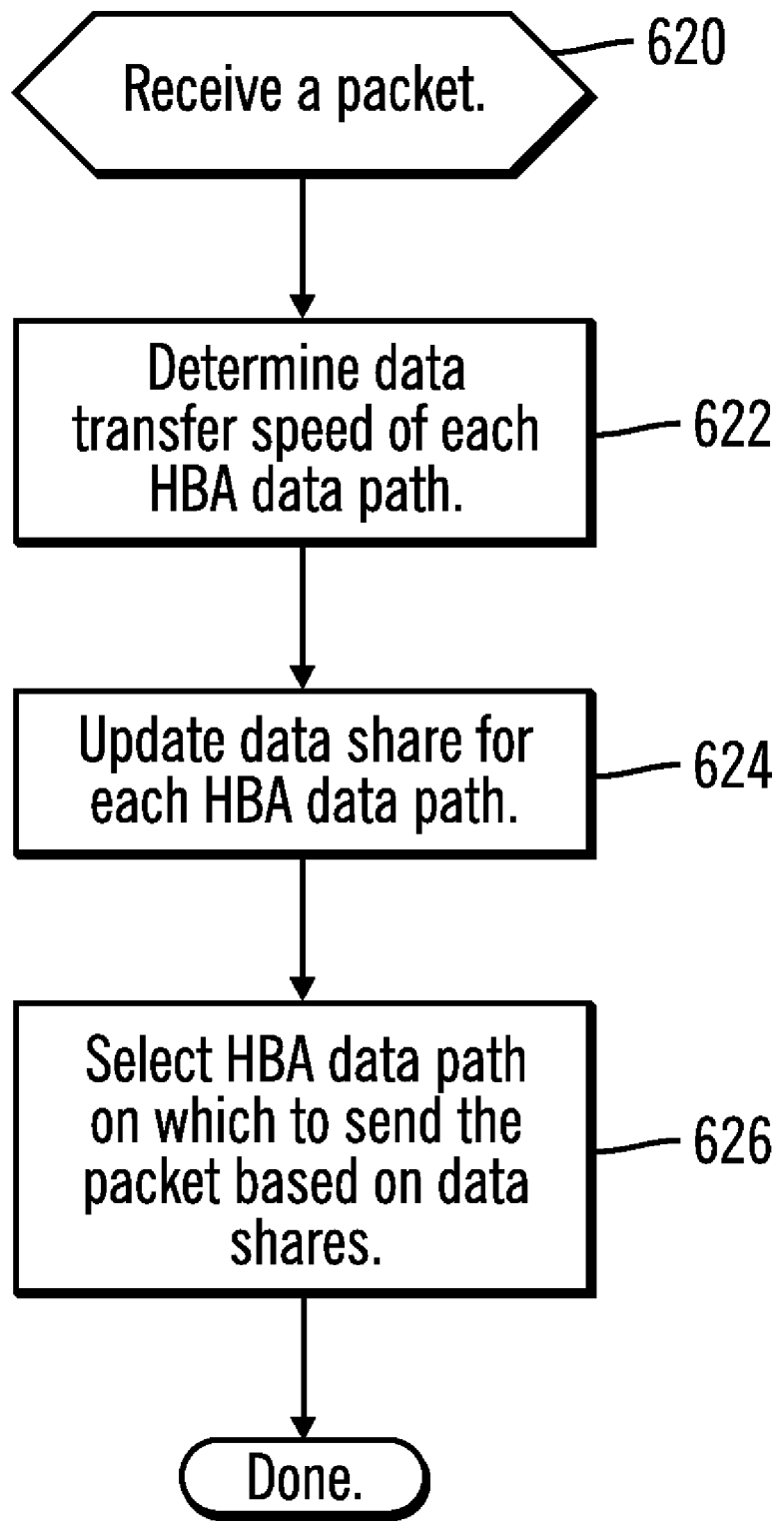

FIGS. 6A and 6B illustrate operations for load balancing in accordance with certain embodiments. For load balancing, each HBA data path in an HBA team has an associated value, referred to as a load balancing share that represents the percentage of a total I/O workload that the given HBA data path is able to handle.

FIG. 6A illustrates operations for static load balancing in accordance with certain embodiments. Control begins at block 600 with receipt of a data packet to be transmitted at the filter driver. In block 602, the filter driver determines the load balancing share associated with each HBA data path in the HBA team. For static load balancing, the load balancing shares may be specified manually and stored, for example, in a Windows® registry. The miniport driver retrieves the load balancing share values and forwards these to the filter driver via the notification callback method. On receiving the retrieved load balancing share values, the filter driver updates the load balancing shares with new values.

In block 604, the filter driver determines the moving mean data length (MDL) of the transmitted packets for each HBA data path (e.g., SCSI transfer length of the packets). In certain embodiments, load balancing may be based on actual data length of transmitted packets, rather than on a number of packets. In block 606, the filter driver determines a data quota for each HBA data path. In certain embodiments, the data quota for a HBA data path is the MDL for the HBA data path multiplied by a ratio of the load balancing share for the HBA data path and a minimal value of a load balancing share in the HBA team (i.e., data quota=MDL*(load balancing share/minimal load balancing share in team)).

In certain embodiments, MDL is recalculated for each packet or group of packets, while data quotas are recalculated periodically (e.g., after a certain number of packets are transferred). The periodic intervals may be determined by a product of the number of HBA data paths in the HBA team and a tunable load balancing frequency update factor. The load balancing frequency update factor allows tuning of load balancing and increases performance. The load balancing frequency update factor may be set, for example, by a system administrator. The higher the frequency of updating of data quotas, the less difference between specified and actual load balancing shares. Also, more frequent updates may take up more processor time.

In block 608, the filter driver determines a maximum number of commands for a target logical unit. In block 610, the filter driver selects a HBA data path on which to send the packet using a round robin technique in which packets are sent along one HBA data path until a data quota is reached or a maximum of commands per the target logical unit is reached.

That is, for static load balancing, a round-robin technique may be used. In certain embodiments, valid HBA data paths for a current HBA team are collected in a double-linked list for the round-robin operation. Then, HBA data paths are switched during the load balancing operation using this list. Otherwise, the packet flow switches to the next HBA team member. That is, in certain embodiments, sending of packets for a given path continues until the amount of data transferred reaches the previously calculated data quota for this HBA data path or a maximum number of SCSI commands per a target LUN is reached.

For static load balancing, the actual distribution of packets among the HBA data paths may differ from a specified distribution (i.e., load balancing shares specified by, for example, a system administrator). The less difference between the actual and specified distributions, the higher the quality of the static load balancing. The specified load balancing share values affect the performance of static load balancing.

FIG. 6B illustrates operations for dynamic load balancing in accordance with certain embodiments. Dynamic load balancing avoids congestion on a single HBA data path as long as there is available bandwidth on other paths by dynamically adjusting I/O workload among paths. Thus, dynamic load balancing attempts to enable more efficient use of a storage/network available bandwidth.

Control begins at block 620 with the filter driver receiving a data packet. In block 622, the filter driver determines a data transfer speed for each HBA data path in the HBA team. In certain embodiments, data transfer speed is calculated for each HBA data path as a ratio of total data transferred and total time spent on transferring data. An updating routine determines how frequently the transfer speeds are to be updated. A tunable parameter for dynamic load balancing is a transfer speed update frequency factor, which defines how often the updating routine is to be invoked. The transfer speed update frequency factor may be tuned based on the specific behavior of the delivery subsystem.

In block 624, the filter driver updates the load balancing share for each HBA data path. Load balancing shares for each path in the HBA team may be updated proportionally to their data transfer speed (i.e., data transfer speed for the selected HBA data path divided by HBA team's data transfer speed). In block 626, the filter driver selects a HBA data path on which to send the packet based on the load balancing shares.

While working in failover and load balancing mode, HBA failures disable one or more HBA team members. With embodiments, the remaining HBA team members continue functioning, maintaining the same ratio between the load balancing shares specified.

Thus, embodiments provide a combination of high availability and static and dynamic load balancing. A software module that implements the solution is relatively small and poses minimal overhead on the system. Embodiments provide the ability to quickly and easily turn on and off the functionality provided by embodiments of the solution by insertion/removal of the filter driver to/from the device stack. Embodiments are compatible across various platforms (e.g., Windows® platforms, either 32 bit or 64 bit). Also, embodiments are applicable to any SCSI and/or iSCSI based SAN and/or Network Attached Storage (NAS) system. Moreover, embodiments for failover and load balancing support multiple (two or more) HBAs.

Additional Embodiments Details

The described techniques for failover and load balancing may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the article of manufacture may comprise a combination of hardware and software components in which the code is embodied, processed, and executed. Of course, those skilled in the art recognize that many modifications may be made to this configuration without departing from the scope of embodiments, and that the article of manufacture may comprise any information bearing medium known in the art.

In the described embodiments, certain logic was implemented in a driver. In alternative embodiments, the logic implemented in the driver and/or network adapter may be implemented all or in part in network hardware.

In certain embodiments, the network adapter may be implemented as a PCI card. In alternative embodiments, the network adapter may comprise integrated circuit components mounted on the computer 102 motherboard.

In certain embodiments, the network adapter may be configured to transmit data across a cable connected to a port on the network adapter. In alternative embodiments, the network adapter embodiments may be configured to transmit data over a wireless network or connection, such as wireless LAN.

The illustrated logic of FIGS. 4A, 4B, 5A, 5B, 5C, 6A, and 6C show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise forms disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments can be made without departing from the spirit and scope of the embodiments, the embodiments reside in the claims hereinafter appended.

What is claimed is:

1. A method for static load balancing implemented in a filter driver, wherein the filter driver performs:
   determining a data quota for each of multiple data paths, wherein the data quota is determined for each of the multiple data paths by calculating:
   mean data length for a data path*(load balancing share for the data path/minimal load balancing share in the multiple data paths);
   identifying a maximum number of commands for a target logical unit; and
   selecting a data path on which to send a packet based on the data quota and the maximum number of commands.

2. The method of claim 1, wherein the filter driver further performs:
   determining a load balancing share associated with each data path in a team; and
   determining a mean data length of transmitted packets for each data path.

3. The method of claim 1, wherein the data path is selected using a round robin technique, and wherein packets are sent along the selected data path until at least one of the data quota for the data path is met and until a maximum number of commands is reached.

4. A method for dynamic load balancing implemented in a filter driver, wherein the filter driver performs:
   determining a data transfer speed for each of multiple data paths;
   updating a load balancing share for each of the multiple data paths opportionally to the data transfer speed of each of the multiple data paths by calculating:
   a data transfer speed for a selected data path divided by a data transfer speed of the multiple data paths; and
   selecting a data path on which to send a packet based on the load balancing share of each of the multiple data paths.

5. The method of claim 4, wherein the data transfer speed is calculated for each of the multiple data paths as a ratio of total data transferred and total time spent on transferring data.

6. The method of claim 4, wherein a frequency at which the data transfer speed is determined is tunable.

7. A system coupled to a network and data storage, comprising:
   a host computer;
   a storage controller managing Input/Output (I/O) access to the data storage, wherein the storage controller is coupled to the host computer; and a filter driver for
   determining a data quota for each of multiple data paths wherein the data quota is determined for each of the multiple data paths by calculating:
   mean data length for a data path*(load balancing share for the data path/minimal load balancing share in the multiple data paths),
   identifying a maximum number of commands for a target logical unit, and
   selecting a data path on which to send a packet based on the data quota and the maximum number of commands.

8. The system of claim 7, wherein the filter driver further performs:
   determining a load balancing share associated with each data path in a team; and
   determining a mean data length of transmitted packets for each data path.

9. The system of claim 7, wherein the data path is selected using a round robin technique, and wherein packets are sent along the selected data path until at least one of the data quota for the data path is met and until a maximum number of commands is reached.

10. A system coupled to a network and data storage, comprising:
   a host computer;
   a storage controller managing Input/Output (I/O) access to the data storage, wherein the storage controller is coupled to the host computer; and
   a filter driver for:
      determining a data transfer speed for each of multiple data paths,
      updating a load balancing share for each of the multiple data path proportionally to the data transfer speed of each of the multiple data paths by calculating:
      a data transfer speed for a selected data path divided by a data transfer, and
      selecting a data path on which to send a packet based on the load balancing share of each of the multiple data paths.

11. The system of claim 10, wherein the data transfer speed is calculated for each of the multiple data paths as a ratio of total data transferred and total time spent on transferring data.

12. The system of claim 10, wherein a frequency at which the data transfer speed is determined is tunable.

13. An article of manufacture comprising a storage medium having stored therein instructions that when executed by a computing device results in the following:
   determining a data quota for each of multiple data paths wherein the data quota is determined for each of the multiple data paths by calculating:
   mean data length for a data path*(load balancing share for the data path/minimal load balancing share in the multiple data paths);
   identifying a maximum number of commands for a target logical unit; and
   selecting a data path on which to send a packet based on the data quota and the maximum number of commands.

14. The article of manufacture of claim 13, the instructions when executed further result in the following:
   determining a load balancing share associated with each data path in a team; and
   determining a mean data length of transmitted packets for each data path.

15. The article of manufacture of claim 13, wherein the data path is selected using a round robin technique, and wherein packets are sent along the selected data path until at least one of the data quota for the data path is met and until a maximum number of commands is reached.

16. An article of manufacture comprising a storage medium having stored therein instructions that when executed by a computing device results in the following:
   determining a data transfer speed for each of multiple data paths;
   updating a load balancing share for each of the multiple data paths proportionally to the data transfer speed of each of the multiple data paths by calculating:
   a data transfer speed for a selected data path divided by a data transfer speed of the multiple data paths; and
   selecting a data path on which to send a packet based on the load balancing share of each of the multiple data paths.

17. The article of manufacture of claim 16, wherein the data transfer speed is calculated for each of the multiple data paths as a ratio of total data transferred and total time spent on transferring data.

18. The system of claim 16, wherein a frequency at which the data transfer speed is determined is tunable.

* * * * *

UNITED STATES PATENT AND TRADEMARK OFFICE
CERTIFICATE OF CORRECTION

| | | |
|---|---|---|
| PATENT NO. | : 7,992,039 B2 | Page 1 of 1 |
| APPLICATION NO. | : 12/749407 | |
| DATED | : August 2, 2011 | |
| INVENTOR(S) | : Belyakov et al. | |

It is certified that error appears in the above-identified patent and that said Letters Patent is hereby corrected as shown below:

Column 10, line 51, delete "opportionally" and replace with --proportionally--.

Signed and Sealed this
Twentieth Day of December, 2011

David J. Kappos
*Director of the United States Patent and Trademark Office*